(12) United States Patent
Liu et al.

(10) Patent No.: US 7,240,371 B2
(45) Date of Patent: Jul. 10, 2007

(54) SOLVENT FREE AQUEOUS POLYURETHANE DISPERSIONS AND ADHESIVE FILMS THEREFROM FOR STRETCH FABRICS

(75) Inventors: Hong Liu, Waynesboro, VA (US); Carmen A. Covelli, Chadds Ford, PA (US); Douglas K. Farmer, Greensboro, NC (US)

(73) Assignee: Invista North America S.A.R.L., Wilmington, DE (US)

( * ) Notice: Subject to any disclaimer, the term of this patent is extended or adjusted under 35 U.S.C. 154(b) by 21 days.

(21) Appl. No.: 11/056,067

(22) Filed: Feb. 11, 2005

(65) Prior Publication Data

US 2006/0183852 A1    Aug. 17, 2006

(51) Int. Cl.
  A41B 9/00    (2006.01)
  A41B 9/06    (2006.01)
  A41D 13/00   (2006.01)
  A41F 9/00    (2006.01)
  D03D 15/08   (2006.01)

(52) U.S. Cl. ............... 2/69; 2/1; 2/73; 2/78.1; 2/109; 2/113; 2/400; 2/401; 442/37; 442/38; 442/149; 442/182; 442/183; 442/184; 442/293; 442/58; 442/59; 442/77; 442/83; 442/89; 442/112; 442/115; 442/119; 450/1; 450/97; 450/132; D2/700; D2/706; D2/728; 524/589; 524/590; 524/591; 524/839; 524/840

(58) Field of Classification Search ......... 524/589, 524/590, 591, 839, 840; 528/44, 45, 59, 528/61, 65, 66, 67, 68, 71, 76, 80, 83, 84, 528/85; 428/423.1; 442/37, 38, 149, 182, 442/183, 184, 293, 728, 58, 59, 77, 83, 89, 442/112, 115, 119; 2/1, 73, 78.1, 113, 109, 2/400, 401; 450/1, 197, 132; D2/700, 706
See application file for complete search history.

(56) References Cited

U.S. PATENT DOCUMENTS

| | | |
|---|---|---|
| 3,560,292 A | 2/1971 | Otto |
| 3,828,367 A | 8/1974 | Bourgeois |
| 4,387,181 A | 6/1983 | Brown et al. |
| 4,801,644 A | 1/1989 | Coogan |
| 5,270,433 A | 12/1993 | Klauck et al. |
| 5,563,208 A | 10/1996 | Konig et al. |
| 5,703,193 A | 12/1997 | Rosenberg et al. |
| 5,833,320 A | 11/1998 | Kaneko et al. |
| 6,018,819 A | 2/2000 | King et al. |
| 6,245,695 B1 | 6/2001 | Masuo et al. |
| 6,555,613 B1 | 4/2003 | Poth et al. |
| 6,586,523 B1 | 7/2003 | Blum et al. |
| 2001/0015141 A1 | 8/2001 | Anderson |
| 2002/0160259 A1 | 10/2002 | Kinn et al. |
| 2003/0220463 A1 | 11/2003 | Bechare et al. |
| 2004/0014880 A1 | 1/2004 | Kuba et al. |
| 2004/0065445 A1 | 4/2004 | Simpson |
| 2004/0122411 A1 | 6/2004 | Hancock-Cooke |
| 2005/0022920 A1 | 2/2005 | Flowler |

FOREIGN PATENT DOCUMENTS

| | | |
|---|---|---|
| EP | 0220000 B1 | 10/1986 |
| EP | 0708163 A | 4/1996 |
| EP | 0308115 A | 3/1999 |
| EP | 1431321 A | 6/2004 |
| EP | 1604807 A | 12/2005 |
| EP | 1609832 A | 12/2005 |
| EP | 1619018 | 1/2006 |
| GB | 795523 A | 5/1958 |
| WO | WO99/50329 A | 10/1999 |
| WO | WO 2004/060949 A1 * | 7/2004 |
| WO | WO2004/074343 | 9/2004 |
| WO | WO2004/098333 A | 11/2004 |

OTHER PUBLICATIONS

AATCC Technical Manual 2002, Test Method 150-2001, "Dimensional Changes in Automatic Home Laundering of Garments."
Annual Book of ASTM Standards, vol. 15.06, Pub. 1993, ASTM Designation D 903-93, "Standard Test Method for Peel or Stripping Strength of Adhesive Bonds."
John Wiley and Sons, Inc., Third Edition 1994, Sidney Siggia, Ph.D, "Quantitative Organic Analysis" via Functional Groups.
Converting Magazine, Peter Walter and William Strong, National Starch & Chemical Company, "Solving Common Coating Flaws in Reverse Roll Coating," delivered at AIMCAL Oct. 2003.
International Search Report to Application No. PCT/US2006/004894 with an International Filing Date of Feb. 10, 2006.

* cited by examiner

Primary Examiner—Patrick Niland
(74) Attorney, Agent, or Firm—Christina W. Geerlof

(57) ABSTRACT

Novel aqueous polyurethane dispersions and adhesive films formed therefrom are provided. The aqueous polyurethane dispersions are provided in solvent-free systems of a prepolymer comprising at least one polyether or polyester polyol, a mixture of MDI isomers, and a diol. The adhesive films from such dispersions can be heat-activated for bonding, lamination, and adhesion of textile fabrics, including stretch fabrics.

6 Claims, 10 Drawing Sheets

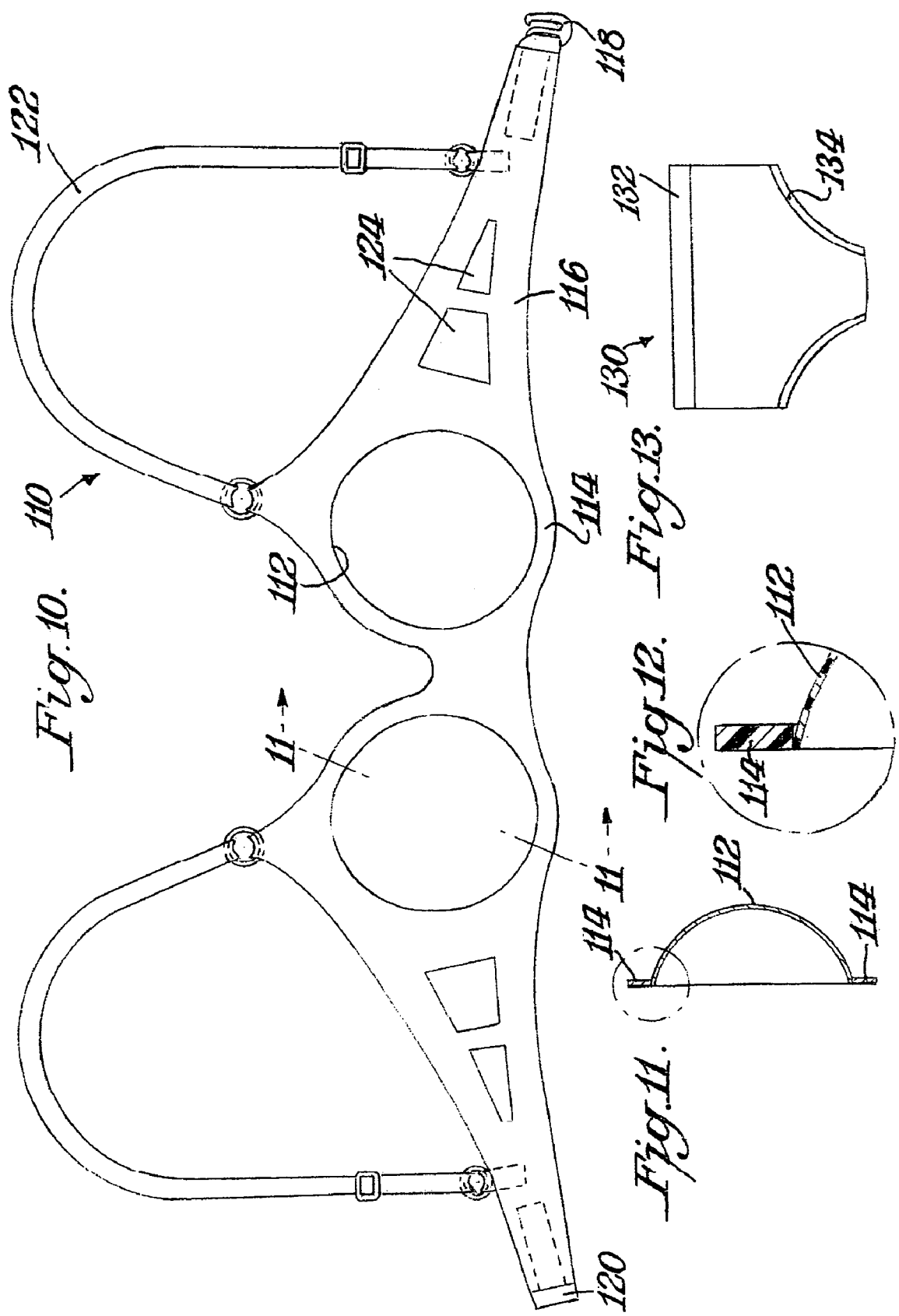

SOLVENT FREE AQUEOUS POLYURETHANE DISPERSIONS AND ADHESIVE FILMS THEREFROM FOR STRETCH FABRICS

FIELD OF THE INVENTION

The present invention relates to novel aqueous polyurethane dispersions and adhesive films therefrom. Specifically, the present invention relates to solvent-free, stable dispersions, which comprise fully formed polyurethaneurea with blocked isocyanate end groups. The dispersions can be formed by prepolymer mixing processes. The present invention additionally relates to adhesive films, formed from such aqueous dispersions, which can be heat-activated for bonding, lamination and adhesion to textile fabrics. The films remain flexible and elastomeric after bonding, lamination or adhesion.

BACKGROUND OF THE INVENTION

Polyurethanes (including polyurethaneureas) can be used as adhesives for various substrates, including textile fabrics. Typically, such polyurethanes are either fully formed non-reactive polymers or reactive isocyanate-terminated prepolymers. Such reactive polyurethane adhesives often require extended curing time to develop adequate bonding strength, which can be a disadvantage in manufacturing processes. In addition, the isocyanate groups of the polyurethanes are known to be sensitive to moisture, which limits the storage stability and reduces the shelf life of the product incorporating such polyurethanes.

Typically, such polymers, when fully formed, are either dissolved in a solvent (solvent borne), dispersed in water (water borne), or processed as thermoplastic solid materials (hot melt) Notably, solvent-based adhesives face ever-tightening health and environmental legislation aimed at reducing volatile organic compound (VOC) and hazardous air pollutant (HAP) emissions. Accordingly, alternatives to conventional solvent-based products are needed.

Hot-melt adhesives, although environmentally safe and easily applied as films, generally have high set and poor recovery when subject to repeated stretch cycles. Therefore, improvements are needed.

Many attempts have been made to develop water borne polyurethane adhesives to overcome these deficiencies.

U.S. Pat. No. 5,270,433 discloses an "adhesive composition comprising a substantially clear and solvent-free, aqueous, one-component polyurethane dispersion containing the reaction products of (a) a polyol mixture comprising polypropylene glycol, (b) a mixture of polyfunctional isocyanates comprising $\alpha, \alpha, \alpha^1, \alpha^1$-tetramethyl xylene diisocyanate (TMXDI), (c) a functional component capable of salt formation in aqueous solution, and (d) optionally, a chain-extending agent." The adhesive films from this composition have low recovery power and poor heat resistance in view of the unsymmetrical structure and steric hindrance of isocyanate groups on TMXDI, preventing the formation of strong inter-chain urea hydrogen bonds in the hard segments of the polymer.

U.S. Patent Application Publication No. 2004/0014880 A1 discloses an aqueous polyurethane dispersion for adhesive bonding in wet and dry laminations stated to have superior coatability, adhesive strength and heat resistance. This dispersion contains a substantial amount of organic solvent—methyl ethyl ketone (MEK).

U.S. Patent Application Publication No. 2003/0220463 A1 discloses a method for making a polyurethane dispersion that is free of organic solvent such as N-methylpyrrolidone (NMP). However, the composition is limited to a prepolymer having low free diisocyanate species, such as methylene bis(4-phenylisocyanate) (4,4'-MDI). The process to produce such a prepolymer with low free diisocyanate is complicated (as disclosed in U.S. Pat. No. 5,703,193). Such processing also requires short path distillation of the free diisocyanate and is thus not economical in producing a prepolymer for making a polyurethane dispersion.

U.S. Pat. No. 4,387,181 discloses a stable aqueous polyurethane dispersion, containing N-methylpyrrolidone (NMP) solvent, prepared by reaction of carboxylic group-containing oxime-blocked, isocyanate-terminated prepolymer and polyamine. The prepolymer is made by reaction of aromatic diisocyanates, such as 4,4'-diphenylmethanediisocyanate (MDI) or toluene diisocyanate (TDI), with polyether or polyester polyols and a dihydroxy alkanoic acid. The oxime-blocked isocyanate groups are capable of reacting with polyamine at 60 to 80° C. within 6 to 18 hours. The dispersion is stable in storage, and the film formed from the dispersion has good tensile properties. However, this dispersion still has: organic solvent present and the longer curing time needed is unsuitable for fabric bonding and lamination in practice.

U.S. Pat. No. 5,563,208 describes an acetone process to prepare an essentially solvent-free aqueous polyurethane dispersion, comprising urethane prepolymers with blocked isocyanate groups and polyamines within the molecular weight range of 60 to 400 in a molar ratio of blocked isocyanate groups to primary and/or secondary amino groups of from 1:0.9 to 1:1.5. This dispersion is stable in storage at room temperatures and gives a heat-resistant binder in coating. It requires long curing time (up to 30 minutes), which is still not suitable for fabric bonding and adhesion. Furthermore, the acetone process requires an additional distillation step to remove the acetone from the dispersion, which makes this process less economical.

U.S. Pat. No. 6,586,523 describes an acetone process for preparing a self-crosslinking polyurethane dispersion for sizing agents, comprising a prepolymer with isocyanate groups partially blocked and partially extended, and excess polyfunctional compounds having molecular weights from 32 to 500 with primary or secondary amino and/or hydroxyl groups. This dispersion composition reduces the curing time to some degree, but still has deficiencies because an additional distillation step to remove the acetone is required.

U.S. Pat. No. 6,555,613 describes a solvent-free aqueous dispersion of a reactive polyurethane having a number average molecular weight (Mn) of from 800 to 14,000, a degree of branching of from 0.0 to 3.0 mol/kg, and an isocyanate functionality from 2.0 to 6.0 per mole. The polyurethane is made from a polyester polyol, a polyisocyanate and polyisocyanate adduct, with low molecular weight polyol and anion-forming units after neutralizing incorporated in the polymer chains, and with blocked isocyanate groups capable of further reactions for crosslinking. The result of such dispersion is a coating material that is hard, glossy and elastic, but such coating material does not have the elastomeric features and stretch/recovery properties required for an adhesive to be used with stretch fabrics.

Thus, it would be desirable to provide an improved aqueous polyurethane dispersion, which overcomes one or more of the deficiencies of the prior art.

SUMMARY OF THE INVENTION

In a first aspect of the invention, a solvent-free aqueous polyurethane dispersion is formed as the reaction product of:

a) at least one polyether (including copolyethers) or polyester polyol component having a number average molecular weight of about 600 to about 3,500, preferably, a poly(tetramethylene ether) glycol having a number average molecular weight of about 1,700 to about 2,100;

b) a polyisocyanate, which is a mixture of 4,4'- and 2,4'-methylene bis(phenyl isocyanate) (MDI) isomers, with the ratio of the 4,4'-MDI to 2,4'-MDI isomers from about 65:35 to about 35:65; and c) at least one diol compound with: (i) hydroxy groups capable of reacting with the mixture of MDI isomers of component b) and (ii) at least one carboxylic acid group capable of forming a salt upon neutralization, wherein the at least one carboxylic acid group is incapable of reacting with the mixture of MDI isomers of component b).

Components a), b), and c), make up a urethane prepolymer that can be further combined with the following components to provide aqueous polyurethane dispersions:

d) at least one neutralizing agent to form an ionic salt with the component c);

e) at least one monofunctional dialkyl amine compound as a blocking agent for isocyanate groups;

f) optionally, at least one diamine chain extension component; and g) optionally, at least one polymeric component having a molecular weight of greater than about 500, with at least three or more primary and/or secondary amino groups per mole of the polymer.

The dispersion may include at least one surface active agent (also referred to as dispersant or surfactant, ionic and/or non-ionic), at least one antifoam and/or defoam agent and, preferably, at least one rheological modifier.

Other additives such as anti-oxidants, UV stabilizers, colorants and/or pigments may optionally be added to the aqueous dispersion before, during, or after the prepolymer is dispersed as the process allows.

When the aqueous dispersion is coated on a release paper and converted to an adhesive film tape, the dialkylamine component e) is selected so that (i) the blocked isocyanate groups are essentially stable in both the coating and drying processes as well as in ambient storage conditions, while, concurrently, (ii) the adhesive film containing the blocked isocyanate groups is capable of being heat-activated at temperatures of about 100° C. to about 200° C., under pressure, for fabric bonding and lamination.

BRIEF DESCRIPTION OF THE DRAWINGS

The present invention will be described in the following detailed description with reference to the following drawings:

FIG. 10 is a front view of a woman's brassiere incorporating dispersions or films according to the invention;

FIG. 11 is a cross sectional view taken along line 11—11 of FIG. 10 showing a brassiere cup;

FIG. 12 is a partial exploded, view taken from FIG. 11 showing the brassiere cup and film interface at the peripheral region surrounding the cup; and FIG. 13 is a front view of a woman's panty incorporating dispersions or films according to the invention.

DETAILED DESCRIPTION OF THE INVENTION

Figure 1:
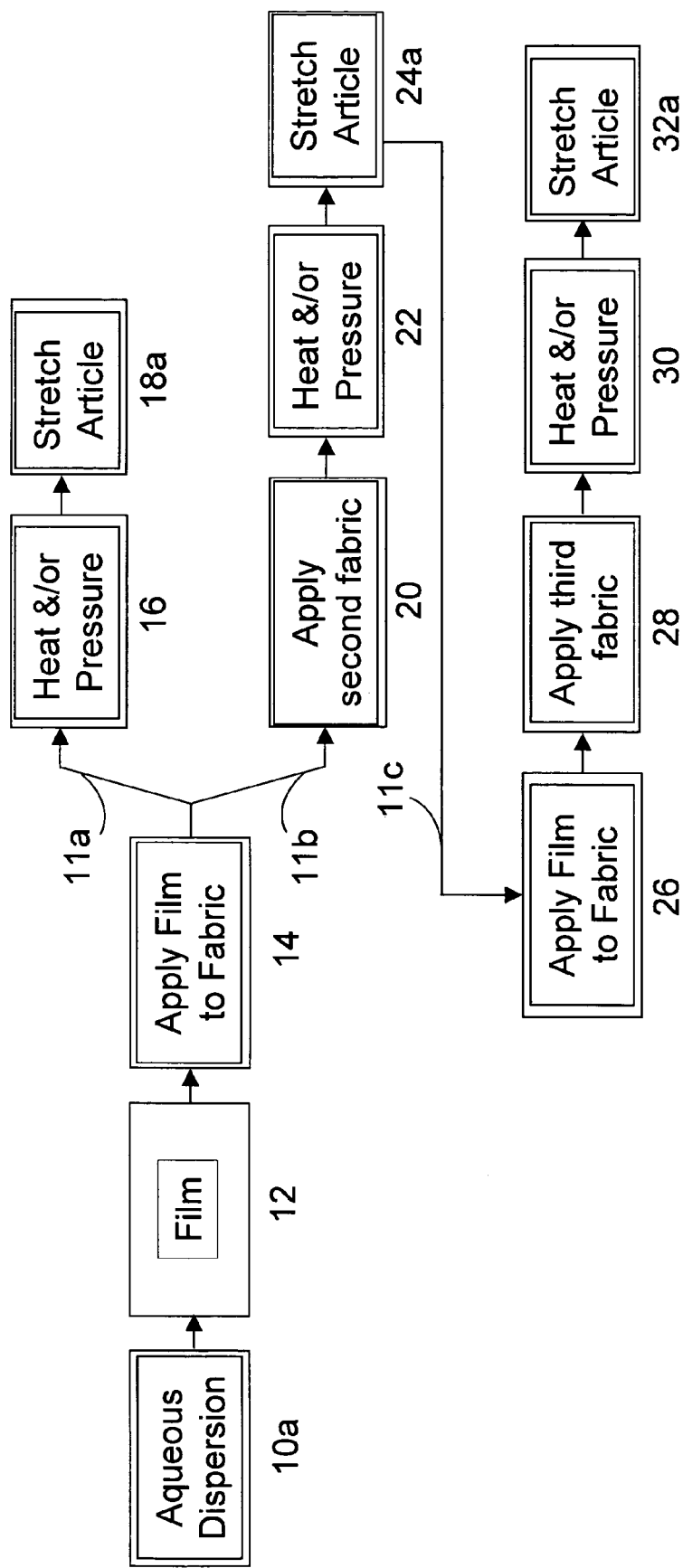
FIG. 1 is a flowchart showing processing steps that may be used to apply dispersions or films according to the invention using a spreading method.

Aqueous polyurethane dispersions falling within the scope of the present invention are provided from particular urethane prepolymers, which also form an aspect of the present invention.

Urethane prepolymers, or capped glycols, can generally be conceptualized as the reaction product of a polyol, a polyisocyanate, and a compound capable of salt-forming upon neutralization, before the prepolymer is dispersed in water and is chain-extended. Such prepolymers can typically be made in one or more steps, with or without solvents. Depending on whether the prepolymer is: dissolved in a less volatile solvent (such as MEK, or NMP) which will remain in the dispersion; dissolved in a volatile solvent such as acetone, which can be later removed; or is dispersed in water without any solvent; the dispersion process can be classified in practice as the solvent process; acetone process, or prepolymer mixing process. The prepolymer mixing process has environmental and economical advantages, and therefore is preferred as the basic process for making the solvent-free aqueous dispersions, in the present invention.

In the prepolymer mixing process, it is important that the viscosity of the prepolymer is adequately low enough, without dilution by a solvent, to be transported and dispersed in water. The present invention in one embodiment, relates to polyurethane dispersions derived from such a prepolymer, which meet this viscosity requirement and do not have any organic solvent in the prepolymer or in the dispersion. In accordance with the invention, the prepolymer is the reaction product of a polyol a), a diisocyanate b) and a diol compound c).

The present invention can, in one embodiment, provide novel, solvent-free, stable, aqueous polyurethane dispersions, which can be processed and applied directly as adhesive materials (i.e., without the need of any additional adhesive materials) for coating, bonding, and lamination of planar sheet articles including textile fabrics and nonwovens, by conventional techniques. Aqueous polyurethane dispersions falling within the scope of the present invention may be provided with essentially no emission of volatile organic materials; acceptable curing time in production; and good adhesion strength, heat resistance, and stretch/recovery properties in finished products and in practical applications.

The present invention can, in an additional embodiment, provide adhesive films or tapes that can be coated on a release paper, whereby aqueous dispersions of the invention can be used for bonding and lamination of planar sheet articles including textile fabrics and nonwovens. The adhesion can be activated, by applying heat and/or pressure onto a substrate and the adhesive film, with a residence time of less than one minute, such as from less than about one second to about five minutes, for example, from about 15 seconds to about 60 seconds. The thus bonded articles have good stretch/recovery properties and are expected to be durable in normal wear and wash cycles.

As used herein, the term "aqueous polyurethane dispersion" refers to a composition containing at least a polyurethane or polyurethane urea polymer or prepolymer (such as the polyurethane prepolymer described herein) that has been dispersed in an aqueous medium, such as water, including de-ionized water. The term further relates to such a composition that has been subjected to drying, for example, in the formation of an adhesive film or tape.

As used herein, the term "solvent," unless otherwise indicated, refers to a non-aqueous medium, wherein the non-aqueous medium includes organic solvents, including volatile organic solvents (such as acetone) and somewhat less volatile organic solvents (such as MEK, or NMP).

As used herein, the term "essentially solvent-free" or "essentially solvent-free system" refers to a composition or dispersion wherein the bulk of the composition or dispersed components has not been dissolved or dispersed in a solvent.

As used herein, the term "adhesive film or tape" refers to a layer comprising an aqueous polyurethane dispersion (such as the aqueous polyurethane dispersion containing the polyurethane prepolymer described herein) that can be directly applied to an article or release paper, which can be used for adhesion to form an elastic or stretch article.

As used herein, the term "stretch article" refers to an article, for example a textile fabric, which has at least one elastic property, in part, due to the application of an adhesive film or tape as described herein.

Polyol components a), suitable as a starting material for preparing urethane prepolymers according to the invention, are polyether glycols and polyester glycols of number average molecular weight of about 600 to about 3,500. In accordance with the invention, polyether polyols are of particular advantage and are therefore used with preference.

Examples of polyether polyols that can be used include those glycols with two or more hydroxy groups, from ring-opening polymerization and/or copolymerization of ethyleneoxide, propylene oxide, trimethylene oxide, tetrahydrofuran, and 3-methyltetrahydrofuran, or from condensation polymerization of a polyhydric alcohol, preferably a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (Invista) with a functionality of 2, is particularly preferred in the present invention.

Examples of polyester polyols that can be used include those ester glycols with two or more hydroxy groups, produced by condensation polymerization of aliphatic polycarboxylic acids and polyols, or their mixtures, of low molecular weights with no-more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid and dodecanedicarboxylic acid. Example of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyester polyol with a melting temperature of about 5° C. to about 50° C. is preferred.

The polyisocyanate component b), suitable as another starting material for making urethane prepolymers according to the invention, is an isomer mixture of diphenylmethane diisocyanate (MDI) containing 4,4'-methylene bis (phenyl isocyanate) and 2,4'-methylene bis(phenyl isocyanate) in the range of 4,4'-MDI to 2,4'-MDI isomer ratios of between about 65:35 to about 35:65, preferably in the range of about 55:45 to about 45:55 and more preferably at about 50:50. Examples of suitable polyisocyanate components include Mondur® ML (Bayer), Lupranate® MI (BASF), and Isonate® 50 O,P' (Dow Chemical).

Diol compounds c), suitable as further starting materials for preparing urethane prepolymers according to the invention, include at least one diol compound with: (i) two hydroxy groups capable of reacting with the polyisocyanates b); and (ii) at least one carboxylic acid group capable of forming salt upon neutralization and incapable of reacting with the polyisocyanates b). Typical examples of diol compounds c) having a carboxylic acid group, include 2,2-dimethylopropionic acid (DMPA), 2,2-dimethylbutanoic acid, 2,2-dimethylovaleric acid, and DMPA initiated caprolactones such as CAPA® HC 1060 (Solvay). DMPA is preferred in the present invention.

The prepolymer can be prepared by mixing starting materials a), b), and c) together in one step and by reacting at temperatures of about 50° C. to about 100° C. for adequate time until all hydroxy groups are essentially consumed and a desired % NCO of the isocyanate group is achieved. Alternatively, this prepolymer can be made in two steps by first reacting starting material a) with excess b), followed by reacting with component c) until a final desired % NCO of the prepolymer is achieved. For example, the % NCO may range from about 1.3 to about 6.5, such as from about 1.8 to about 2.6. Significantly, no organic solvent is added to or mixed with the starting materials before, during or after the reaction.

In an embodiment of the present invention, the prepolymer comprises components a), b), and c), which are combined together and provided in the following ranges of weight percentages, based on the total weight of the prepolymer:

about 34% to about 89% of component a), about 59% to about 10% of component b); and about 7.0% to about 1.0% of component c).

In another embodiment of present invention, the prepolymer comprises Terathane® 1800 polyether glycol as component a), Mondur® ML diisocyanate as component b), and 2,2-dimethylopropionic acid (DMPA) as component c). Within such embodiments, these components may, for example, be present in the following ranges of weight percentages, based on the total weight of the prepolymer:

a) Terathane® 1800 polyether glycol: about 61% to about 80%;

b) Mondur® ML diisocyanate: about 35% to about 18%; and
c) 2,2-dimethylopropionic acid (DMPA): about 4.0% to about 2.0%.

The prepolymer prepared from components a), b) and c) should have a bulk viscosity (without any solvent present) below about 6,000 poises, such as below about 4,500 poises, measured by the falling ball method at 40° C. This prepolymer, containing carboxylic acid groups along the polymer chains, can be dispersed with a high speed disperser into a de-ionized water medium that comprises: at least one neutralizing agent d), to form an ionic salt with the acid; at least one surface active agent (ionic and/or non-ionic dispersant or surfactant); and, optionally, at least one diamine chain extension component f). Alternatively, the neutralizing agent can be mixed with the prepolymer before being dispersed into the water medium. At least one antifoam and/or defoam agent and preferably at least one rheological modifier can be added to the water medium before, during, or after the prepolymer is dispersed.

Examples of suitable neutralizing agents d) to convert the acid groups to salt groups include: tertiary amines (such as triethylamine, N,N-diethylmethylamine, N-methylmorpholine, N,N-diisopropylethylamine, and triethanolamine) and alkali metal hydroxides (such as lithium, sodium and potassium hydroxides). Primary and/or secondary amines may be also used as the neutralizing agent for the acid groups. The degrees of neutralization are generally between about 60% to about 140%, for example, in the range of about 80% to about 120% of the acid groups.

Examples of suitable diamine chain extenders f) include: 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis(cyclohexylamine), isophorone diamine, 2,2-dimethyl-1,3-propanediamine, meta-tetramethylxylenediamine, and Jeffamine® (Texaco) of molecular weight less than 500.

Examples of suitable surface active agents include: anionic, cationic, or nonionic dispersants or surfactants, such as sodium dodecyl sulfate, sodium dodecylbenzenesulfonate, ethoxylated nonylphenols, and lauryl pyridinium bromide.

Examples of suitable antifoaming or deforming agents include: Additive 65 (a silicone additive from; Dow Corning), and Surfynol™ DF 110L (a high molecular weight acetylenic glycol non-ionic surfactant from Air Products & Chemicals).

Examples of suitable rheological modifiers include: hydrophobically-modified ethoxylate urethanes (HEUR), hydrophobically-modified alkali swellable emulsions (HASE), and hydrophobically-modified hydroxy-ethyl cellulose (HMHEC).

At least one monofunctional dialkyl amine compound e), as the blocking agent for isocyanate; groups, is added to the water medium during or after the prepolymer is dispersed. For example, the blocking agent can be added to the water mixture immediately after the prepolymer is dispersed. Optionally at least one polymeric, component g) (MW>about 500), with at least three or more primary and/or secondary amino groups per mole of the polymer, is added to the water medium after the prepolymer is dispersed and the blocking agent is added.

Examples of suitable mono-functional dialkylamine blocking agents e) include: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine. The molar ratio of the amine blocking agent to the isocyanate groups of the prepolymer prior to dispersion in water generally should range from about 0.05 to about 0.50, for example from about 0.20 to about 0.40. Catalysts may be used for the de-blocking reactions.

Examples of the suitable polymeric component g) include: polyethylenimine, poly(vinylamine), poly(allylamine), and poly(amidoamine) dendrimers.

Other additives that may be optionally included in the aqueous dispersion include: anti-oxidants, UV stabilizers, colorants, pigments, crosslinking agents, phase change materials (i.e., Outlast®, commercially available from Outlast Technologies, Boulder, Colo.), antimicrobials, minerals (i.e., copper), microencapsulated well-being additives (i.e., aloe vera, vitamin E gel, caffeine, scents or aromas), nanoparticles (i.e., silica or carbon), calcium carbonate, flame retardants, antitack additives, chlorine degradation additives, and/or dye-assist agent's (i.e., Methacrol®, commercially available from E.I. DuPont de Nemours, Wilmington, Del.). Such optional additives may be added to the aqueous dispersion before, during, or after the prepolymer is dispersed, as the process allows. No organic solvent is added to the aqueous dispersion at any time.

Polyurethane aqueous dispersions falling within the scope of the present invention should be expected to have a solids content of from about 10% to about 50% by weight, for example from about 30% to about 45% by weight. The viscosity of polyurethane aqueous dispersions falling within the scope of the present invention may be varied in a broad range from about 10 centipoises to about 100,000 centipoises depending on the processing and application requirements. For example, in one embodiment, the viscosity is in the range of about 500 centipoises to about 30,000 centipoises. The viscosity may be varied by using an appropriate amount of thickening agent, such as from about 0 to about 2.0 wt %, based on the total weight of the aqueous dispersion.

The solvent-free aqueous polyurethane dispersions of the present invention are particularly suitable for adhesive films or tapes, which can be used for fabric bonding, lamination, and adhesion purposes when applied with heat and pressure for a relatively short period of time. Pressures, can for example, range from about atmospheric pressure to about 60 psi and times can range from less than about one second to about 30 minutes in accordance with the bonding method used.

Such adhesive films or tapes may be made by coating the dispersion onto a release paper and drying to remove water at temperatures below about 100° C. through commercially available processes to form a film on the paper. The formed film sheets can be slit into strips of desired width and wound-up into spools for later use in applications to form stretch articles, for example textile fabrics. Examples of such applications include: stitch-less or seamless garment constructions; seam seal and reinforcement; labels and patches bonding to garments; and localized stretch/recovery enhancement. The adhesion bonding can be developed in the temperature range of from about 100° C. to about 200° C., such as from about 130° C. to about 200° C., for example, from about 140° C. to about 180° C., in a period of seconds to minutes, for example, less than about one minute. This bonding is expected to be strong and durable when exposed to repeated wear, wash, and stretch in a textile fabric garment.

In addition, articles with laminated films can be molded. For example, fabric can be molded under conditions appropriate for the hard yarn in the fabric.

Lamination can be carried out to secure the film to a fabric using any method wherein heat is applied to the laminate surface. Methods of heat application include, for example, ultrasonic, direct heat, indirect heat, and microwave. Such direct lamination may provide an advantage in view of other methods used in the art in that the film may not only bond to the substrate via a mechanical interaction but also via a chemical bond. For example, if the substrate has any reactive hydrogen functional groups, such groups may react with the isocyanate and hydroxyl groups on the film polymer, thereby providing a chemical bond between the substrate and the film polymer. Such chemical bonding can give a film a much stronger bond to the substrate. Such bonding may occur in dry films that are cured onto a substrate or in wet dispersions that are dried and cured in one step. Materials without an active hydrogen include polypropylene fabrics and anything with a fluoropolymer or a silicone based surface. Materials with an active hydrogen include, for example, nylon, cotton, polyester, wool, silk, cellulosics, acetates, metals, and acrylics.

Methods that can be used to apply dispersions and films falling within the scope of the present invention on an article include, but are not limited to: roll coating (including reverse roll coating); use of a metal tool or knife blade (for example, pouring a dispersion onto a substrate and then casting the dispersion into uniform thickness by spreading it across the substrate using a metal tool, such as a knife blade); spraying (for example, using a pump spray bottle); dipping; painting; printing; stamping; and impregnating the article. These methods can be used to apply the dispersion directly onto a substrate without the need of further adhesive materials and can be repeated if additional/heavier layers are required. The dispersions can be applied to any fabrics of knits, wovens or nonwovens made from synthetic, natural, or synthetic/natural blended materials for coating, bonding, lamination and adhesion purposes. The water in the dispersion can be eliminated with drying during the processing (for example, via air drying or use of an oven), leaving the precipitated and coalesced polyurethane layer on the fabrics to form an adhesive bond.

At least one coagulant may optionally be used to minimize penetration of dispersions according to the invention into a fabric or other article. Examples of coagulants that may be used include calcium nitrate (including calcium nitrate tetrahydrate), calcium chloride, aluminum sulfate (hydrated), magnesium acetate, zinc chloride (hydrated) and zinc nitrate.

Figure 8:
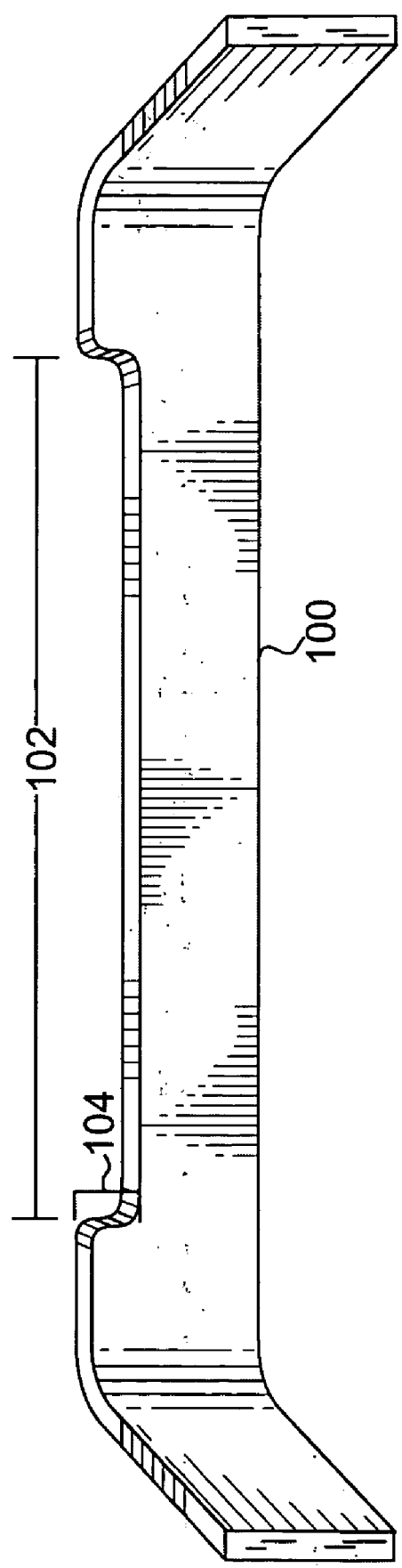
FIG. 8 is an illustration of a knife blade that can be used to distribute dispersions or films according to the invention.
Figure 9:
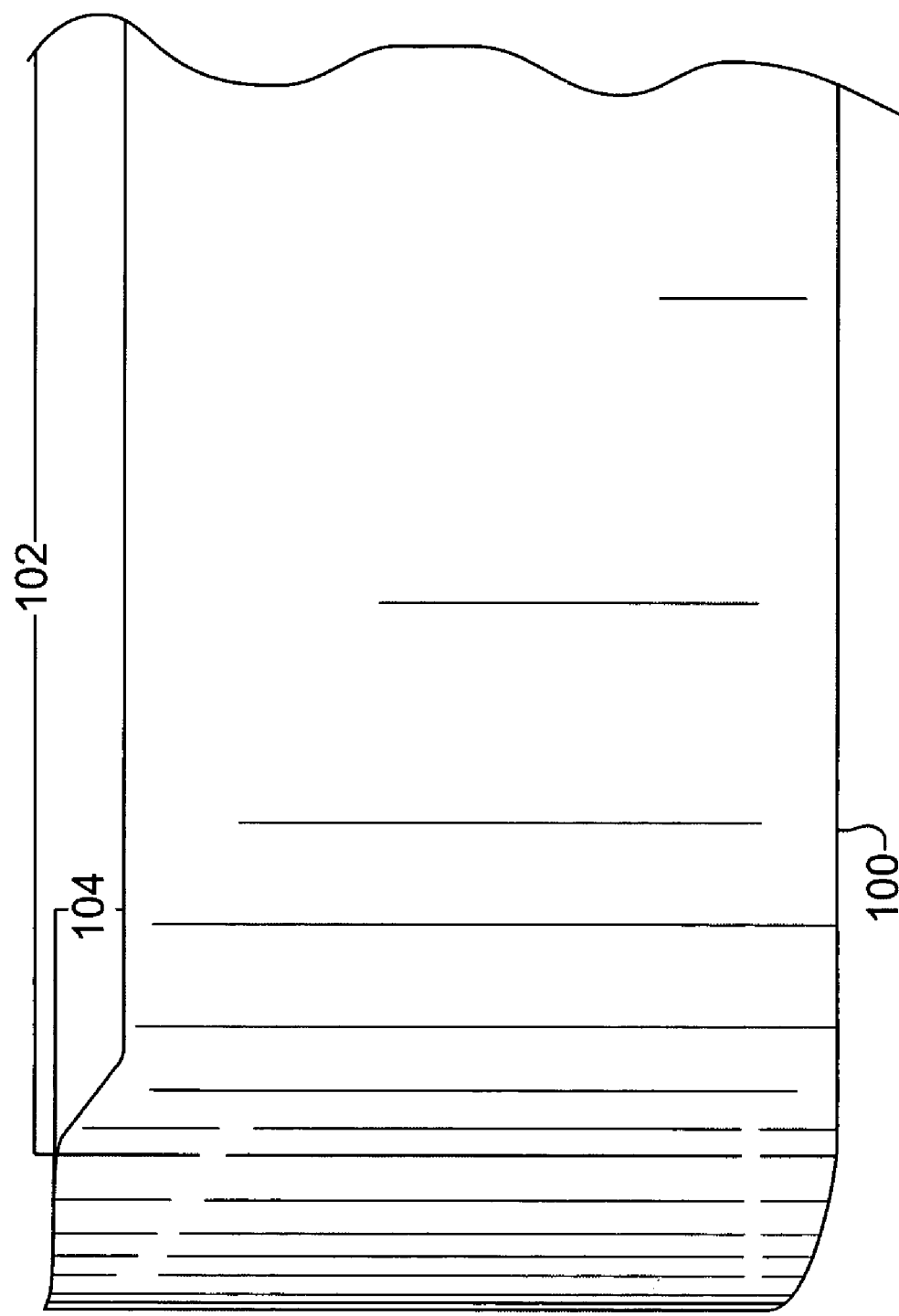
FIG. 9 is an exploded view of a portion of the knife blade of FIG. 8.

An example of a tool that can be used for applying dispersions falling within the scope of the present invention is the knife blade shown in FIGS. 8 and 9. The knife blade 100, can be made of metal or any other suitable material. The knife blade can heave a gap of a predetermined width 102 and thickness 104. The gap may range in thickness, for example, from 5 mils to 50 mils, such as a thickness of 5 mils; 10 mils, 15 mils, 25 mils, 30 mils, or 45 mils.

The thickness of dispersions and films-falling within the scope of the present invention may vary, depending on the application and method of application. In the case of dry tapes, the final thickness may, for example, range from about 0.1 mil to about 250 mil such as from about 0.5 mil to about 25 mil, including from about 1 to about 6 mil (one mil=one one thousandth of an inch). For liquid dispersions, the amount used may, for example, range from about 2.5 g/m$^2$ to about 6.40 kg/m$^2$, such as from about 12.7 to about 635 g/m$^2$, including from about 25.4 to about 152.4 g/m$^2$.

Types of planar sheets and tapes that can be coated with dispersions and films falling within the scope of the present invention include, but are not limited to: fabrics, including wovens and knits; nonwovens; leather (real or synthetic); paper; metal; plastic; and scrim.

End articles that can be produced using the dispersions and films falling within the scope of the present invention include, but are not limited to: apparel, which includes any type of garment or article of clothing; knitted gloves; upholstery; hair accessories, bed sheets; carpet and carpet backing; conveyor belts; medical applications, such as stretch bandages; personal care items, including incontinence and feminine hygiene products; and footwear.

Examples of apparel or garments that can be produced using the dispersions and films falling within the scope of the present invention, include but are not limited to, undergarments, brassieres, panties, lingerie, swimwear, shapers, camisoles, hosiery, sleepwear, aprons, wetsuits, ties, scrubs, space suits, uniforms, hats, garters, sweatbands, belts, active wear, outerwear, rainwear, cold-weather jackets, pants, shirtings, dresses, blouses, mens and womens tops, sweaters, and all components therein.

Figure 4:
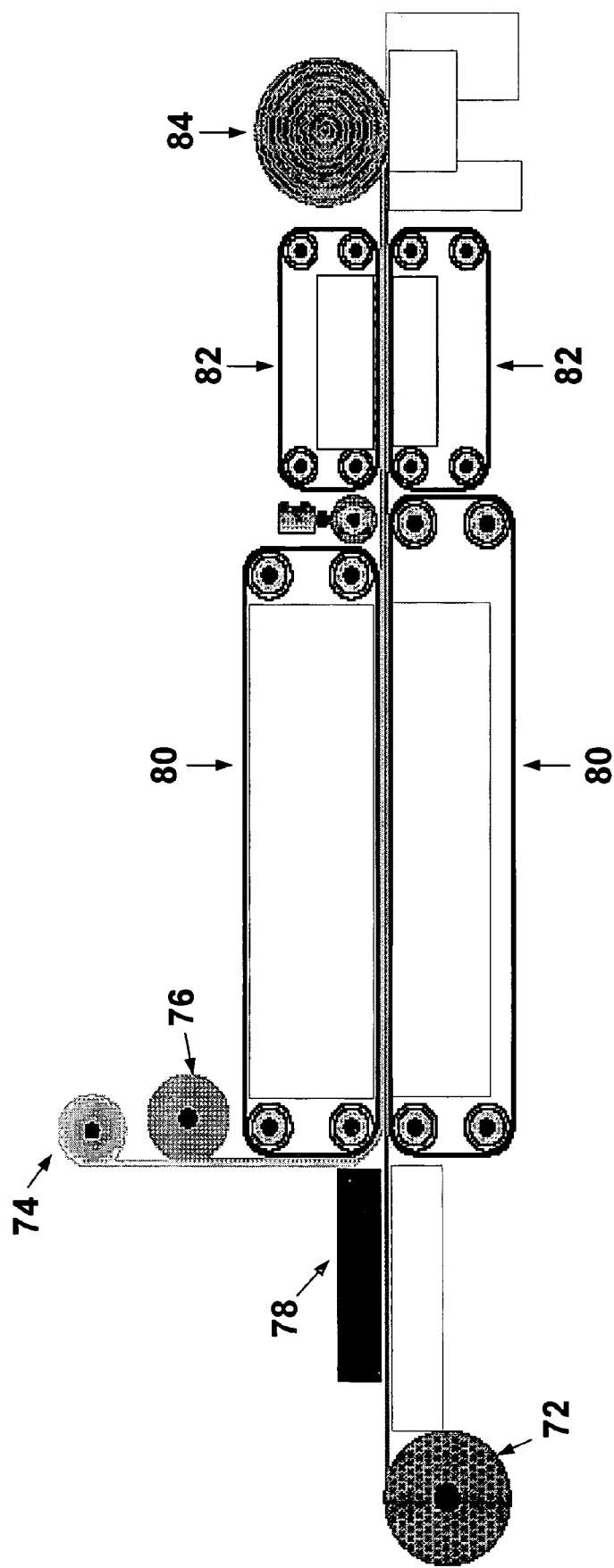
FIG. 4 is a schematic diagram of a process using a flat bed lamination machine to form a laminated article.

FIG. 4 is a representative diagram of a flatbed laminating machine. A roll of fabric substrate 72 is unwound and, preheated in zone 78. A second roll of fabric substrate 76 and roll of film 74 are unwound and enter the lamination heat/pressure zones 80. After heating, the fabric/film/fabric sandwich structure is cooled in the cooling zone 82. Roll 84 represents the rolled up fabric/film/fabric laminate.

Methods for performing and overcoming common problems in reverse roll coating are described in Walter, et al., "Solving common coating flaws in Reverse Roll Coating," *AIMCAL Fall Technical Conference* (Oct. 26–29, 2003), the entire disclosure of which is incorporated herein by reference.

Figure 5:
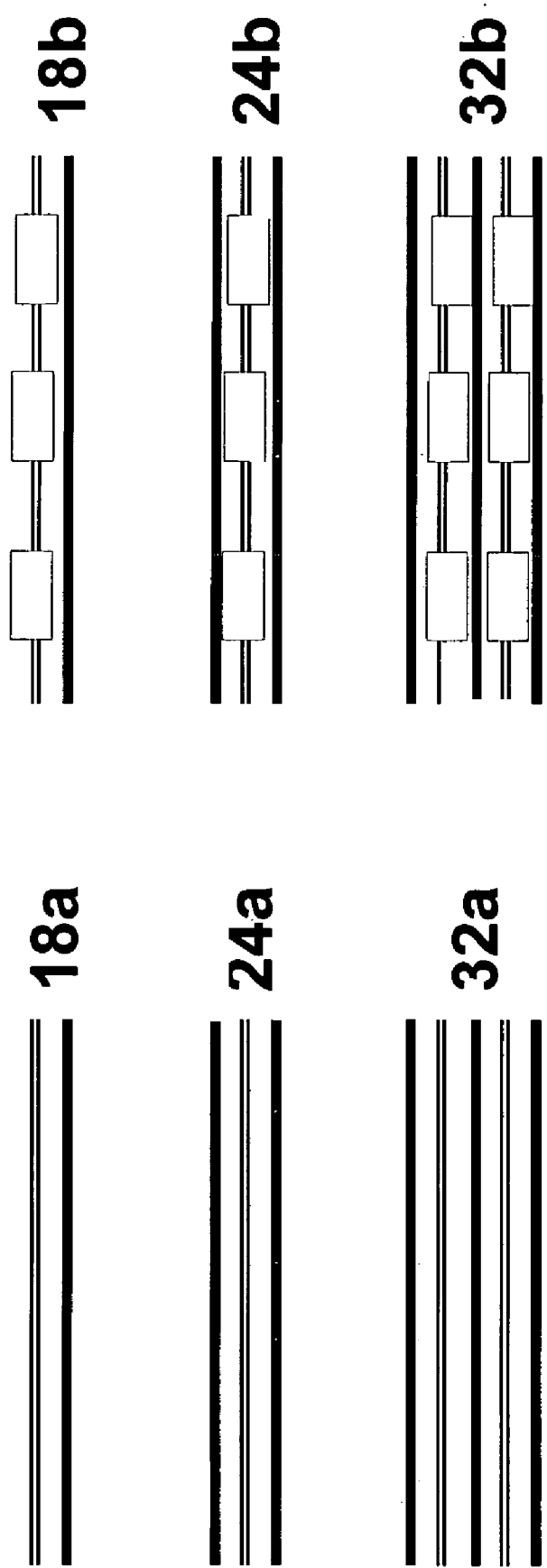
FIG. 5 is a cross-sectional view showing application of dispersions or films according to the invention onto substrates using a spreading method.
Figure 6:
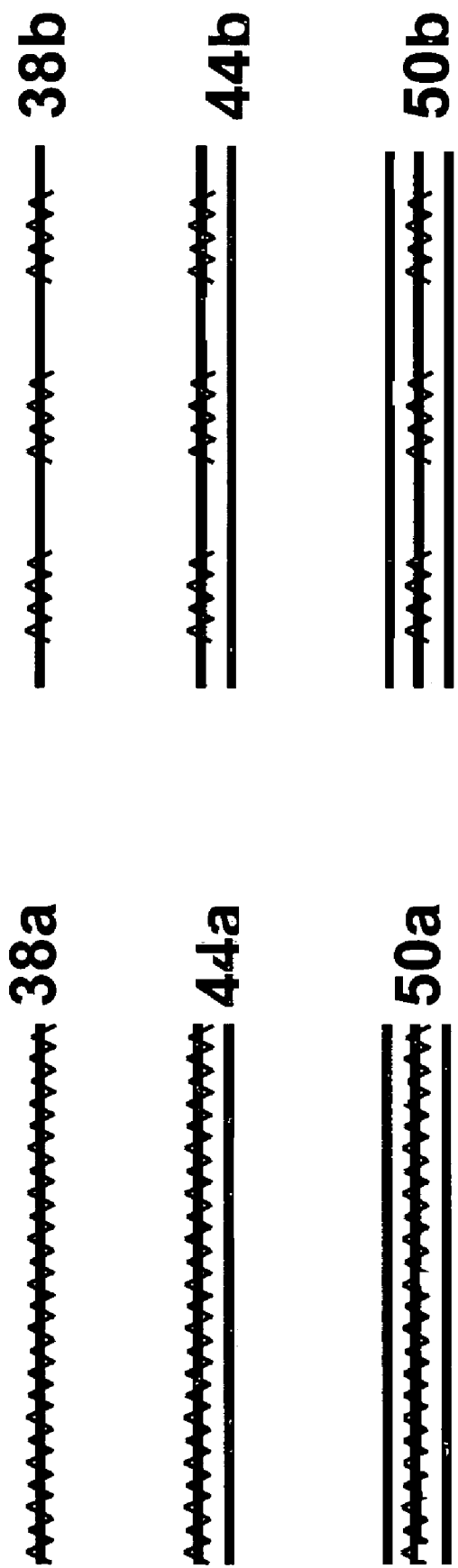
FIG. 6 is a cross-sectional view showing application of dispersions or films according to the invention onto substrates using a dipping method.
Figure 7:
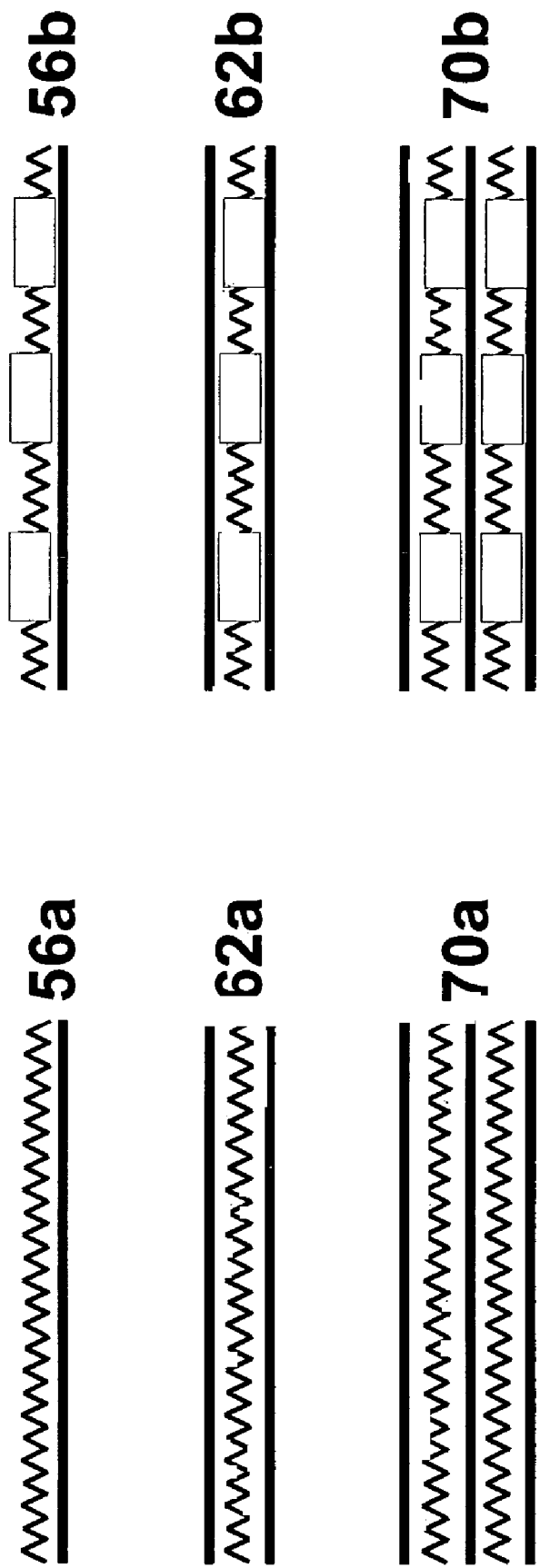
FIG. 7 is a cross-sectional view showing application of dispersions or films according to the invention onto substrates using a painting or spraying method.

Dispersions and films falling within the scope of the present invention may be applied continuously or selectively to a given substrate. In this regard, FIGS. 5–7 show, in cross-sectional view, schematic illustrations of applications of dispersions and films falling within the scope of the present invention. In these figures, substrates are represented by thick black lines and dispersions and films falling within the scope of the present invention are represented as: (1) two parallel thin lines when applied via a spreading method (via use of a knife blade, etc.), as shown in FIG. 5; (2) a zigzag line superimposed on a thick black line when applied via a dipping method, as shown in FIG. 6; or (3) a zigzag line between or above thick black lines when applied via a painting or spray method, as shown in FIG. 7. The drawings on the left-hand side of the figures, designated with a number followed by the letter "a", represent continuous application of dispersions and films falling within the scope of the present invention whereas the drawings on the right-hand side of the figures, designated with a number followed by the letter "b," represent selective or segmented application of dispersions and films falling within the scope of the present invention. While not shown in FIGS. 5–7, it is also contemplated that dispersions and films falling within the scope of the present invention can be applied both continuously and in segments in the same application, for example, continuously on or between some layers, and in segments on or between other, layers.

FIGS. 10–13 show representative examples of garments that can be made to incorporate dispersions or films falling within the scope of the present invention.

FIG. 10 shows a brassiere 110 having fabric brassiere cups 112 formed within a support structure that includes a peripheral region 114 surrounding the cups 112, and body-wrapping sides 116 that terminate with fastening means, such as a hook 118 and mating loop 120. The brassiere 110 further includes shoulder straps 122. The brassiere 110 can be made to incorporate dispersions or films falling within the scope of the present invention. Such dispersions or films can be provided for or on any number of locations on the brassiere, including, but not limited to, the shoulder straps 122, the peripheral region 114, and the body-wrapping sides 116. Such dispersions or films can be provided anywhere where a seam would be expected to be present to join one or more segments of material in the bra. As shown in FIG. 10, the brassiere cups 112 and geometric shaped regions 124 along the body wrapping sides 116 do not have film applied. All other fabric components include a film according to the invention. While not specifically shown in FIG. 10, brassiere cups 112 may be molded using dispersions falling within the scope of the present invention.

FIG. 11 shows a cross-sectional view of a brassiere cup 112. FIG. 12 shows an exploded view of the edge of the cup that meets the peripheral region 114 surrounding the cup. As shown in FIGS. 11 and 12, the brassiere cup 112 is formed of fabric to which no dispersion or film has been applied. The peripheral region 114 has a film applied, and thus has a greater thickness than the fabric of the cup, which comprises the thickness of the film and fabric together. The peripheral region 114 offers some breast supporting rigidity and firmness, without the uncomfortable rigidity provided by an underwire.

FIG. 13 shows a woman's panty or brief 130 that can be made to incorporate dispersions or films falling within the scope of the present invention for enhanced elasticity or enhanced support. Such dispersions or films can be provided for or on any number of locations on the panties or briefs 130, including, but not limited to, the waistband 132 and the leg openings 134.

Analytical Methods

In the examples that follow, the following analytical methods were used:

Peel Strength for Adhesive Bonds

ASTM D903-93, the entire disclosure of which is incorporated herein by reference, was modified for testing of film laminated fabrics. The sample size used for testing was 2 inches×6 inches (5 cm×15 cm). The separation rate was 2 inches per minute (5 centimeter per minute). Data are reported as pounds of force per inch of sample width (kilogram per millimeter), as shown in Table 2.

Wash Test

AATCC test method 150-2001, the entire disclosure of which is incorporated herein by reference, was used for the washing of molded bra cups. The machine cycle was (I) normal/cotton sturdy. The washing temp was (III) 41° C. The drying procedure was (A) (i) tumble cotton sturdy 66° C. for 30 minutes with a 10 minute cool down time.

EXAMPLES

Figure 2:
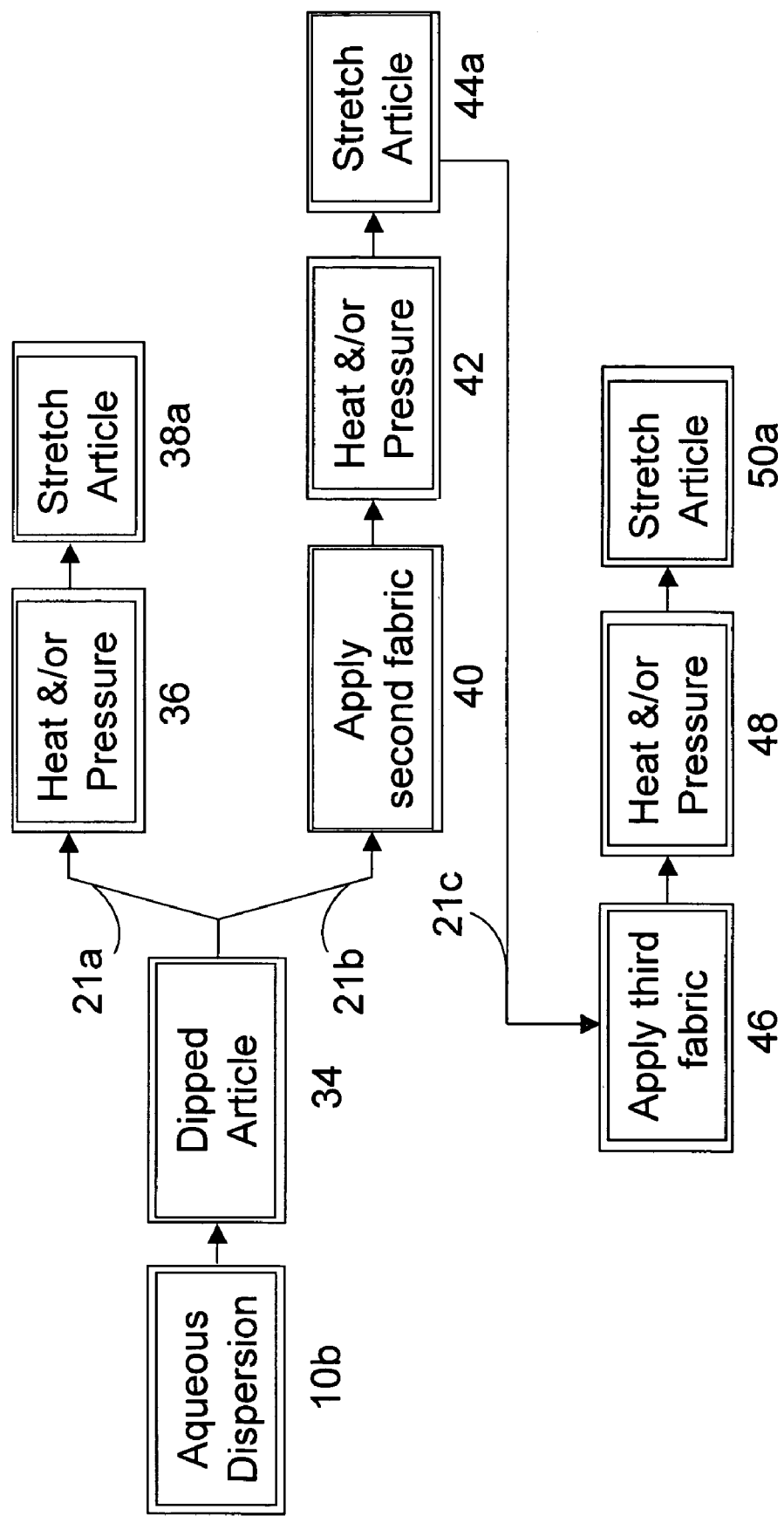
FIG. 2 is a flowchart showing processing steps that may be used to apply dispersions or films according to the invention using a dipping method.
Figure 3:
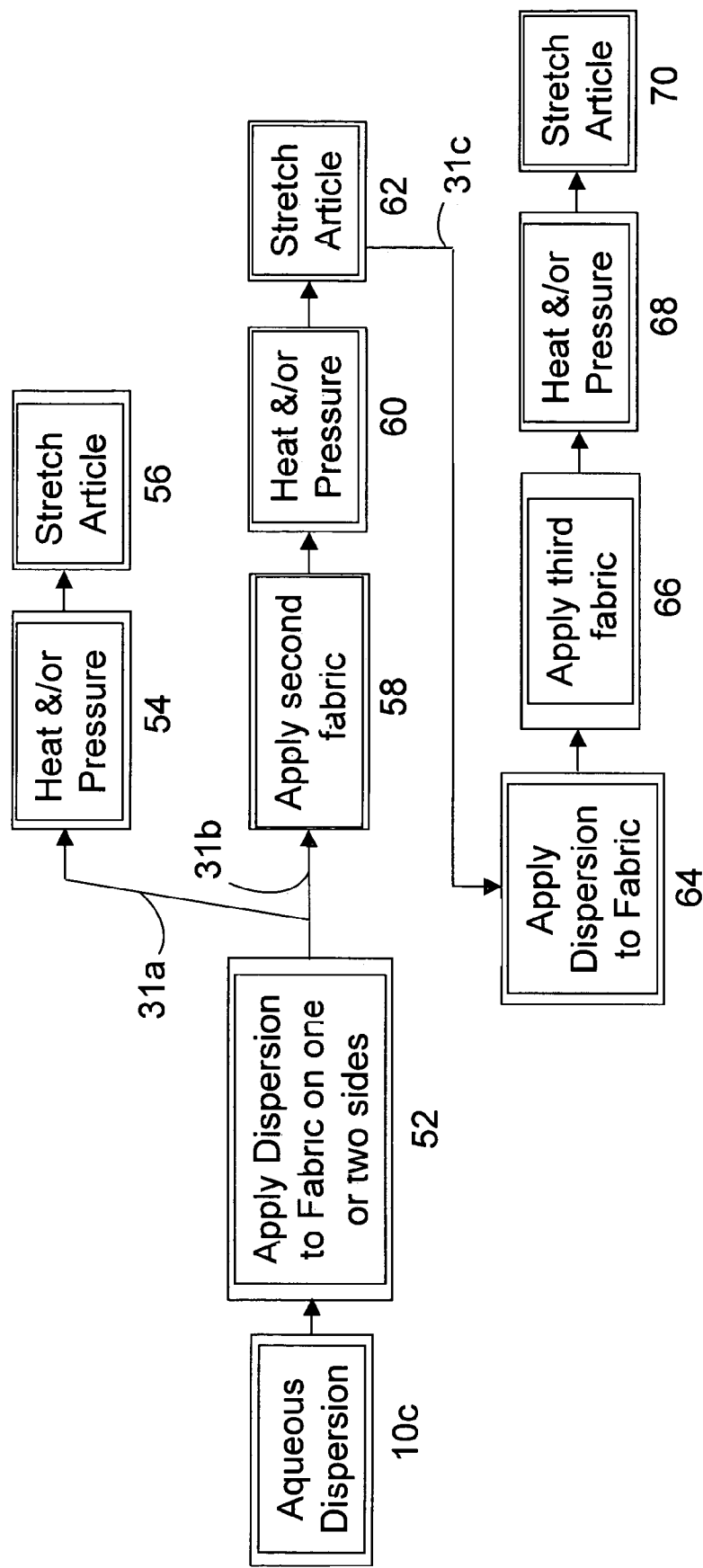
FIG. 3 is a flowchart showing processing steps that may be used to apply dispersions or films according to the invention using a painting or spraying method.

Representative embodiments of the present invention will be described with reference to the following examples that illustrate the principles and practice of the present invention. In these examples:

the reference numbers refer to elements shown in the flowcharts of FIGS. 1–3 and, where appropriate, the cross-sectional illustrations of FIGS. 5–7;

Terathane® 1800 is a linear polytetramethylene ether glycol (PTMEG), with a number average molecular weight of 1,800 (commercially available from Invista, S. à. r. L., of Wichita, Kans. and Wilmington, Del.);

Pluracol® HP 4000D is a linear, primary hydroxyl terminated polypropylene ether glycol, with a number average molecular weight of 400 (commercially available from BASF, Bruxelles, Belgium);

Mondur® ML is an isomer mixture of diphenylmethane diisocyanate (MDI) containing 50–60% 2,4'-MDI isomer and 50–40% 4,4'-MDI isomer (commercially available from Bayer, Baytown, Tex.);

Lupranate® MI is an isomer mixture of diphenylmethane diisocyanate (MDI) containing 45–55% 2,4'-MDI isomer and 55–45% 4,4'-MDI isomer (commercially available from BASF, Wyandotte, Mich.);

Isonate® 125MDR is a pure mixture of diphenylmethane diisocyanate (MDI) containing 98% 4,4'-MDI isomer and 2% 2,4'-MDI isomer (commercially available from the Dow Company, Midland, Mich.); and DMPA is 2,2-dimethylopropionic acid.

The following prepolymer samples were prepared with MDI isomer mixtures, such as Lupranate® MI and Mondur® ML, containing a high level of 2,4'-MDI.

Example 1

The preparation of the prepolymer was conducted in a glove box with nitrogen atmosphere. A 2000 ml Pyrex® glass reaction kettle, which was equipped with an air pressure driven stirrer, a heating mantle, and a thermocouple temperature measurement, was charged with about 382.5 grams of Terathane® 1800 glycol and about 12.5 grams of DMPA. This mixture was heated to about 50° C. with stirring, followed by the addition of about 105 grams of Lupranate® MI diisocyanate. The reaction mixture was then heated to about 90° C. with continuous stirring and held at about 90° C. for about 120 minutes, after which time the reaction was completed, as the % NCO of the mixture declined to a stable value, matching the calculated value (% NCO aim of 1.914) of the prepolymer with isocyanate end groups. The viscosity of the prepolymer was determined in accordance with the general method of ASTM D1343-69 using a Model DV-8 Falling Ball Viscometer, (sold by Duratech Corp., Waynesboro, Va.), operated at about 40° C. The total isocyanate moiety content, in terms of the weight percent of NCO groups, of the capped glycol prepolymer was measured by the method of S. Siggia, "Quantitative Organic Analysis via Functional Group", 3rd Edition, Wiley & Sons, New York, pp. 559–561 (1963), the entire disclosure of which is incorporated herein by reference.

Example 2

The preparation procedures were the same as Example 1, except that the following ingredients were used in the reaction mixture:

Terathane® 1800: about 361 grams;
DMPA: about 19 grams; and
Mondur® ML: about 120 grams.

Example 3

The preparation procedures were the same as Example 1, except that the following ingredients were used in the reaction mixture:

Terathane® 1800: about 349 grams;
DMPA: about 21 grams; and
Mondur® ML: about 130 grams.

Example 4

The preparation procedures were the same as Example 1, except that the following ingredients were used in the reaction mixture:
Terathane® 1800: about 329 grams;
Pluracol® HP 4000D: about 30 grams;
DMPA: about 21 grams; and
Mondur® ML: 6 about 120 grams.

Example 5

The preparation procedures were the same as Example 1, except that the following ingredients were used in the reaction mixture:
Terathane® 1800: about 331 grams;
Pluracol® HP 4000D: about 30 grams;
DMPA: about 19 grams; and
Mondur® ML: about 120 grams.

Comparative Examples

In the following prepolymer samples the preparation procedures and the ingredient type and amount were kept the same, except for the MDI diisocyanate. For comparison, Isonate® 125MDR was used at the same amount in place of Lupranate® MI or Mondur® ML in the reaction mixtures as shown below:

Example 6C

Terathane® 1800: about 382.5 grams;
DMPA: about 12.5 grams; and
Isonate® 125MDR: about 105 grams.

Example 7C

Terathane® 1800: about 361 grams;
DMPA: about 19 grams; and
Isonate® 125MDR: about 120 grams.

Example 8C

Terathane® 1800: about 349 grams;
DMPA: about 21 grams; and
Isonate® 125MDR: about 130 grams.

Example 9C

Terathane® 1800: about 329 grams;
Pluracol® HP 4000D: about 30 grams;
DMPA: about 21 grams; and
Isonate® 125MDR: about 120 grams.

Example 10C

Terathane® 1800: about 331 grams;
Pluracol® HP 4000D: about 30 grams;
DMPA: about 19 grams; and
Isonate® 125MDR: about 120 grams.

The viscosities, as measured by the falling ball method at 40° C., of the example prepolymer samples, (Examples 1 through 5) and comparative examples samples (Examples 6C through 10C) are listed in Table 1 for comparison:

TABLE 1

Prepolymer viscosities in poises by falling ball method at 40° C.

| Example | Falling Ball Viscosity at 40° C. (poise) |
|---------|------------------------------------------|
| 1       | 3086                                     |
| 2       | 3292                                     |
| 3       | 2468                                     |
| 4       | 4382                                     |
| 5       | 3876                                     |
| 6C      | 6722                                     |
| 7C      | 7690                                     |
| 8C      | 6560                                     |
| 9C      | 12148                                    |
| 10C     | 6187                                     |

As shown in Table 1, the prepolymers prepared with Lupranate® MI or Mondur® ML gave substantially lower viscosity, in the absence of any solvent during or after the prepolymer preparation, than those prepared with Isonate® 125MDR. The prepolymer viscosities from the comparative example samples, without the dilution using a solvent, were too high to be transported and dispersed in water in downstream processing.

Example 11

The solvent-free prepolymer, as prepared according to the procedures and composition described in Example 1, was used to make the polyurethaneurea aqueous dispersion of the present invention.

A 2,000 ml stainless steel beaker was charged with about 700 grams of de-ionized water, about 15 grams of sodium dodecylbenzenesulfonate (SDBS), and about 10 grams of triethylamine (TEA). This mixture was then cooled with ice/water to about 5° C. and mixed with a high shear laboratory mixer with rotor/stator mix head (Ross, Model 100LC) at about 5,000 rpm for about 30 seconds. The viscous prepolymer, prepared in the manner as Example 1 and contained in a metal tubular cylinder, was added to the bottom of the mix head in the aqueous solution through a flexible tubing with applied air pressure. The temperature of the prepolymer was maintained between about 50° C. and about 70° C. The extruded prepolymer stream was dispersed and chain-extended with water under the continuous mixing of about 5,000 rpm. In a period of about 50 minutes, a total amount of about 540 grams of prepolymer was introduced and dispersed in water. Immediately after the prepolymer was added and dispersed, the dispersed mixture was charged with about 2 grams of Additive 65 (commercially available from Dow Corning®, Midland Mich.) and about 6 grams of diethylamine (DEA). The reaction mixture was then mixed for about another 30 minutes. The resulting solvent-free aqueous dispersion was milky white and stable. The viscosity of the dispersion was adjusted with the addition and mixing of Hauthane HA thickening agent 900 (commercially available from Hauthway, Lynn, Mass.) at a level of about 2.0 wt % of the aqueous dispersion. The viscous dispersion was then filtered through a 40 micron Bendix metal mesh filter and stored at room temperatures for film casting or lamination uses. The dispersion had solids level of 43% and a viscosity of about 25,000 centipoises. The cast film from this dispersion was soft, tacky, and elastomeric.

Example 12

The solvent-free prepolymer, as prepared according to the procedures and composition described in Example 1, was used to make the polyurethaneurea aqueous dispersion of the present invention.

A 2,000 ml stainless steel beaker was charged with about 900 grams of de-ionized water, about 15 grams of sodium dodecylbenzenesulfonate (SDBS), and about 10 grams of triethylamine (TEA). This mixture was then cooled with ice/water to about 5° C. and mixed with a high shear laboratory mixer with rotor/stator mix head (Ross, Model 100LC) at about 5,000 rpm for about 30 seconds. The viscous prepolymer, prepared in the manner as Example 1 and contained in a metal tubular cylinder, was added to the bottom of the mix head in the aqueous solution through a flexible tubing with applied air pressure. The temperature of the prepolymer was maintained between about 50° C. and about 70° C. The extruded prepolymer stream was dispersed and chain-extended with water under the continuous mixing of about 5,000 rpm. In a period of about 50 minutes, a total amount of about 540 grams of prepolymer was introduced and dispersed in water. Immediately after the prepolymer was added and dispersed, the dispersed mixture was charged with about 2 grams of Additive 65 (commercially available from Dow Corning®, Midland Mich.) and about 6 grams of diethylamine (DEA). The reaction mixture was then mixed for about another 30 minutes. The resulting solvent-free aqueous dispersion was milky white and stable. The viscous dispersion was then filtered through a 40 micron Bendix metal mesh filter and stored at room temperatures for film casting or lamination uses. The dispersion had solids level of 40% and a viscosity of about 28 centipoises. The cast film from this dispersion was soft, tacky, and elastomeric.

Example 13

The solvent-free prepolymer, as prepared according to the procedures and composition described in Example 1, was used to make the polyurethaneurea aqueous dispersion of the present invention.

A 2,000 ml stainless steel beaker was charged with about 700 grams of de-ionized water, about 15 grams of sodium dodecylbenzenesulfonate (SDBS), and about 10 grams of triethylamine (TEA). This mixture was then cooled with ice/water to about 5° C. and mixed with a high shear laboratory mixer with rotor/stator mix head (Ross, Model 100LC) at about 5,000 rpm for about 30 seconds. The viscous prepolymer, prepared in the manner as Example 1 and contained in a metal tubular cylinder, was added to the bottom of the mix head in the aqueous solution through a flexible tubing with applied air pressure. The temperature of the prepolymer was maintained between about 50° C. and about 70° C. The extruded prepolymer stream was dispersed and chain-extended with water under the continuous mixing of about 5,000 rpm. In a period of about 50 minutes, a total amount of about 540 grams of prepolymer was introduced and dispersed in water. Immediately after the prepolymer was added and dispersed, the dispersed mixture was charged with about 2 grams of Additive 65 (commercially available from Dow Corning®, Midland Mich.) and about 6 grams of diethylamine (DEA). The reaction mixture was then mixed for about another 30 minutes. The resulting solvent-free aqueous dispersion was milky white and stable. The viscous dispersion was then filtered through a 40 micron Bendix metal mesh filter and stored at room temperatures for film casting or lamination uses. The dispersion had solids level of 43% and a viscosity of about 28 centipoises. The cast film from this dispersion was soft, tacky, and elastomeric.

Example 14C

The preparation procedures were the same as Example 11, except that DEA was not added into the dispersion after the prepolymer was mixed. Initially, the dispersion appeared to be no different from Example 11. However, when the dispersion was aged at room temperatures for one week or more, the film cast from this dispersion Was brittle and not suitable for adhesions or laminations.

Example 15

The filtered aqueous dispersion as prepared in Example 11 was used to coat films on silicone coated release paper, with a continuous 12-inch laboratory reverse roll coater. The coater was equipped with a 3-zone drying oven, with the temperature settings at about 60° C., 75° C. and 120° C., respectively. The total residence time of drying was about 6 minutes. The dried film of about 3-mil thick was wound up at a speed of about 2 meters per minute. The elastomeric film 12 was able to peel off from the release paper easily and used for bonding fabrics through laminations.

Example 16

The filtered aqueous dispersion as prepared in Example 11 was used to coat films on silicone coated release paper to form elastomeric film 12. Lab samples were prepared manually by securing a 12 inch×12 inch (30 cm×30 cm) sheet of double sided silicone release paper (Covermount DS from Print Mount Co., Inc 401-232-0096) to a work surface with masking tape. The aqueous dispersion was poured onto the release paper and cast into a uniform thickness by spreading the dispersion across the release paper using a metal knife blade tool, as shown in FIGS. 8 and 9, having a 6 inch wide gap of 5 mil thickness. Excess solution was blotted with a paper towel. Castings were air-dried overnight under a hood. The resulting film 12 was easy to peel away from the release paper for further use.

Example 17

The film on release paper 12 from Example 15 was placed onto the back of a 12 inch×12 inch (30 cm×30 cm) warp knit nylon with spandex fabric 14. The fabric/film/release paper sandwich was fed into a Hashima HP-400C Belt Oven Laminator (Hashima Co., Ltd, Gifu-City Japan, 058-245-4501) and laminated at 165° C., with a 20 second residence time and a pressure setting of P=1, 16, as shown by path 11*a* in FIG. 1. The release paper was removed, leaving film/fabric laminate stretch article 18*a*.

TABLE 2

Peel Strength for Film/Fabric Composites in pounds/inch

| Example | Adhesion Peel Strength (lb/in) |
| --- | --- |
| 18 | 2.56 |
| 19 | 1.71 |
| 20 | 4.25 |
| 21 | 1.72 |

TABLE 2-continued

Peel Strength for Film/Fabric Composites in pounds/inch

| Example | Adhesion Peel Strength (lb/in) |
|---------|-------------------------------|
| 25 | 6.17 |
| 26 | 5.26 |
| 31 | 4.06 |

Example 18

The laminated stretch article 18*a* was covered with another 12 inch×12 inch (30 cm×30 cm) piece of warp knit nylon spandex fabric. The fabric/film/fabric sandwich was fed into the Hashima laminator and laminated at 165° C., with a 20 second residence time and a pressure setting of P=1, to give stretch article 24*a*. The peel strength for Example 18 was 2.56 lb/in, see Table 2.

Example 19

Film 12 of Example 15 was laminated to fabric under the same conditions as Example 17, with the exception that the lamination temperature was 120° C. The release paper was removed, leaving a film/fabric laminate stretch article 18*a*. The film side of article 18*a* was covered with another 12 inch×12 inch (30 cm×30 cm) layer of warp knit nylon spandex fabric. The fabric/film/fabric sandwich was fed into the Hashima laminator and laminated at 165° C., with a 20 second residence time and a pressure setting of P=1 to give a stretch article 24*a*. The peel strength for Example 19 was 1.71 lb/in, see Table 2.

Example 20

In this example, two stretch articles of 18*a* were layered with the film sides facing each other. The fabric/film/film/fabric sandwich was fed into the Hashima laminator and laminated at 165° C. with a 20 second residence time and a pressure setting of P=1 to give a stretch article. The peel strength for Example 20 was 4.25 lb/in, see Table 2.

Example 21

Film 12 of Example 15 was carefully removed from release paper and placed onto a 12 inch×12 inch (30 cm×30 cm) warp knit nylon with spandex fabric 14. Another 12 inch×12 inch (30 cm×30 cm) layer of warp knit nylon spandex fabric was placed onto cast film 20. The fabric/film/fabric sandwich 20 was fed into the Hashima laminator and laminated at 165° C., with 20 a second residence time and a pressure setting of P=1 22 to give a stretch article 24*a*. The peel strength for Example 21 was 1.72 lb/in, see Table 2.

Example 22

A second film was carefully removed from release paper and placed on the fabric/film/fabric sandwich 24*a* to form article 26. A second 12 inch×12 inch (30 cm×30 cm) layer of warp knit nylon spandex fabric was placed onto the second layer of cast film 28. The fabric/film/fabric/film/fabric sandwich was fed into the Hashima laminator and laminated at 165° C., with 20 second residence time and a pressure setting of P=1 as in 30, to give stretch article 32*a*.

Example 23

In this example, a piece of warp knit nylon spandex fabric (1 inch×12 inch (2.5 cm×30 cm)) was dipped into high viscosity aqueous dispersion 10*b* from Example 11 and pulled out, and then the excess was squeezed off between gloved fingers. The excess was squeezed off a second time between gloved fingers to give the dipped, article 34. The coated strip was hung and allowed to air dry overnight under a hood to give stretch article 38*a*, path 21*a* in FIG. 2.

Example 24

A piece of lightweight nonwoven fabric, deformable in the cross-machine direction, is soaked into low viscosity aqueous dispersion 10*b*, prepared according to the method of Example 12 (40 wt % solids and 28 centipoises). The dipped article 34 is allowed to drip to remove excess dispersion liquid, and then is hung for drying in a fume hood for overnight 36 to give stretch article 38*a*, path 21*a* in FIG. 2.

Example 25

In this example, stretcharticle 38*a* from Example 23 was covered with a warp knit nylon spandex fabric (6 inch×12 inch (15 cm×30 cm)) 40. The layered article 40 was fed into the Hashima laminator and laminated at 165° C., with 20 second residence time and a pressure setting of P=1 as in 42, path 21*b* in FIG. 2, to give stretch article 44*a*. The peel strength for Example 25 was 6.17 lb/in, see Table 2.

Example 26

In this example, stretch article 44*a* was covered with a warp knit nylon spandex fabric (6 inch×12 inch (15 cm×30 cm)) 46, path 21*c* in FIG. 2. The layered article 46 was fed into the Hashima laminator and laminated at 165° C., with 20 second residence time and a pressure setting of P=1 as in 48 to give stretch article 50*a*. The peel strength for, Example 26 was 5.26 lb/in, see Table 2.

Example 27

In this example, a filtered solution of the aqueous dispersion as prepared in Example 12 is poured into a typical spray bottle. The filtered aqueous dispersion 10*c* is applied directly to bistretch cotton/spandex twill fabric using spray bottle, 52 as shown in FIG. 3. The fabric is air-dried, 54, to form a stretch article 56*a*, path 31*a* in FIG. 3.

Example 28

A piece of stretch denim fabric is pretreated by soaking into a bath containing a water solution of 20 wt. % calcium nitrate tetrahydrate as a coagulant and dried in an oven at 100° C. for 30 minutes. The aqueous dispersion 10*c*, prepared according to the method of Example 12 (40 wt % solids and 28 centipoises) is coated evenly onto the backside of the pretreated fabric with a blade, as shown in FIGS. 8 and 9, having a 5 mil gap thickness. The dispersion is coagulated on the surface of the fabric without soaking through. This fabric is then dried 54 in the oven at 80° C. for 60 minutes to give a stretch article 56*a*, path 31*a* in FIG. 3.

Example 29

A piece of stretch denim fabric is coated with a high viscosity dispersion 10c of Example 11 (43 wt % solids and 25000 centipoises). This increased viscosity allows the dispersion coated on one side of the fabric without soaking through the fabric 52. The fabric is dried 54 in an oven at 80° C. for 60 minutes 56a, path 31a in FIG. 3.

Example 30

A 12 inch×12 inch (30 cm×30 cm) warp knit nylon spandex fabric piece was secured to the work surface using masking tape (allowing the fabric to be held under slight tension in the warp direction). The filtered aqueous dispersion 10c of Example 11 (43 wt % solids and 25000 centipoises) was poured onto the fabric 52. This increased viscosity allows the dispersion coated on one side of the fabric without soaking through the fabric 52. A uniform thickness of film was made by spreading the dispersion across the fabric using the metal tool, shown in FIGS. 8 and 9, having a 6 inch wide gap of 10 mil thickness. Excess solution was blotted with a paper towel. Coated fabric was air-dried overnight under a hood. The article 52 was fed into the Hashima laminator and laminated at 165° C., with 20 second residence time and a pressure setting of P=1 as in 54 to form a stretch article 56a, path 31a in FIG. 3.

Example 31

A 12 inch×12 inch (30 cm×30 cm) warp knit nylon spandex fabric piece was secured to the work surface using masking tape (allowing the fabric to be held under slight tension in the warp direction). The filtered aqueous dispersion 10c of Example 11 (43 wt % solids and 25000 centipoises) was poured onto the fabric 52. A uniform thickness of film was made by spreading the dispersion across the fabric using the metal tool, shown in FIGS. 8 and 9, having a 6 inch wide gap of 10 mil thickness. Excess solution was blotted with a paper towel. Another 12 inch×12 inch (30 cm×30 cm) warp knit nylon spandex fabric was laid over the dispersion and lightly pressed to promote adhesion 58, path 31b in FIG. 3. The coated fabric sandwich was air-dried overnight under a hood. The layered article 58 was fed into the Hashima laminator and laminated at 165° C., with 20 second residence time and a pressure setting of P=1 as in 60 to give stretch article 62a. The peel strength for Example 31 was 4.06 lb/in, see Table 2.

TABLE 3

Molded Bra Cup Height in cm

| Example | Height Immediately After Molding (cm) | Height After 2A Wash Cycle (cm) |
|---|---|---|
| 32 | 7.4 | 4.2 |
| 33C | 7.3 | 1.9 |
| 34 | 6.7 | 6.4 |
| 35C | 6.8 | 5.9 |

Example 32

Stretch article 24a, FIG. 1, was made according to Example 21 except that 100% cotton circular knit-fabric was used as the top fabric and the bottom fabric. A 12 inch×12 inch (30 cm×30 cm) piece of cotton based stretch article 24a was molded into a bra cup using a Texilformung Willi Lehman GmbH Molding Machine Type 2030 NT equipped with an 8.5 cm deep circular bullet mold. The bullet and conical mold base were heated to 195° C., while the ring clamp was heated to 185° C. The fabric was molded according to standard practice for 45 seconds. The cup height was measured immediately after molding and again after a wash and dry cycle according to AATCC Test Method 150-2001. The laminated and molded cup with cotton had a height of 7.4 cm. After washing, the cup of Example 32 had a height of 4.2 cm.

Example 33C

A 12 inch×12 inch (30 cm×30 cm) piece of 100% cotton circular knit was molded in the same manner as Example 32. The cup height was measured immediately after molding and again after a wash and dry cycle according to AATCC Test Method 150-2001. The 100% cotton circular knit molded cup had a height of 7.3 cm. After washing the cup of Example 33C had a height of 1.9 cm.

Example 34

Stretch article 24a, FIG. 1, was made with warp knit nylon spandex fabric as top fabric and bottom fabric, according to Example 21. A 12 inch×12 inch (30 cm×30 cm) piece of warp knit nylon spandex based stretch article 24a was molded in the same manner as Example 32. The cup height was measured immediately after molding and again after a wash and dry cycle according to AATCC Test Method 150-2001. The laminated and molded cup had a height of 6.7 cm. After washing the cup of Example 34 had a height of 6.4 cm.

Example 35C

A 12 inch×12 inch (30 cm×30 cm) piece of 100% warp knit nylon was molded in the same manner as Example 32. The cup height was measured immediately after molding and again after a wash and dry cycle according to AATCC Test Method 150-2001. The laminated and molded cup had a height of 6.8 cm. After washing the cup of Example 35C had a height of 5.9 cm.

While the present invention has been described in an illustrative manner, it should be understood that the terminology used is intended to be in a nature of words or description rather than of limitation. Furthermore, while the present invention has been described in terms of several illustrative embodiments, it is to be appreciated that those skilled in the art will readily apply these teachings to other possible variations of the invention.

What is claimed is:

1. A stretch article comprising:
   at least one adhesive film or tape of:
   a substantially solvent-free aqueous polyurethane dispersion of:
   (1) a prepolymer, which comprises:
      a) at least one polyether or polyester polyol, wherein said polyether or polyester polyol has a number average molecular weight of about 600 to about 3,500;
      b) a mixture of 4,4'- and 2,4'-methylene bis(phenyl isocyanate) (MDI) isomers, wherein the ratio of 4,4'-MDI to 2,4'-MDI isomers ranges from about 65:35 to about 35:65; and c) at least one dial compound comprising: hydroxy groups capable of reacting with the mixture of MDI isomers of component b) and at least one carboxylic acid group capable of forming a salt upon neutralization, wherein said at least one carboxylic acid group is incapable of reacting with the mixture of MDI isomers of component b);

(2) at least one neutralizing agent to form an ionic salt with the at least one diol compound; and (3) at least one monofunctional dialkyl amine compound as a blocking agent for isocyanate groups;

and a substrate to which said adhesive film or tape is applied, wherein the adhesive film or tape is applied to the substrate upon release from a release paper.

2. The stretch article according to claim 1, wherein the adhesive film or tape is bonded or adhered textile fabric.

3. The stretch article according to claim 2, wherein the adhesive film or tape is bonded or adhered to a seam or a support area on the textile fabric.

4. The stretch article according to claim 2, wherein the article is a garment.

5. The stretch article according to claim 4, wherein the garment is selected from the group consisting of undergarments, brassieres, panties, lingerie, swimwear, shapers, camisoles, hosiery, sleepwear, aprons, wetsuits, ties, scrubs, space suits, uniforms, hats, garters, sweatbands, belts, activewear, outerwear, rainwear, cold-weather jackets, pants, shirtings, dresses, blouses, mens and womens tops, and sweaters.

6. The stretch article according to claim 5, wherein the garment is selected from the group consisting of undergarments, brassieres, panties, and lingerie.

* * * * *